United States Patent [19]
Widmayer

[11] 3,931,695
[45] Jan. 13, 1976

[54] PLANT GROWTH METHOD AND APPARATUS

[75] Inventor: Don Frederick Widmayer, Bethesda, Md.

[73] Assignee: Controlled Environment Systems Inc., Rockville, Md.

[22] Filed: Jan. 9, 1975

[21] Appl. No.: 539,866

[52] U.S. Cl. .................... 47/58; 47/1.2; 47/DIG. 6
[51] Int. Cl.² .......................................... A01G 31/02
[58] Field of Search .............. 47/58, 1.2, 17, DIG. 6

[56] References Cited
UNITED STATES PATENTS

| | | | |
|---|---|---|---|
| 2,222,310 | 11/1940 | Emery | 47/1.2 X |
| 2,244,677 | 6/1941 | Cornell | 47/17 |
| 2,486,512 | 11/1949 | Armstrong | 47/1.2 |
| 3,254,447 | 6/1966 | Ruthner | 47/1.2 |
| 3,529,379 | 9/1970 | Ware | 47/17 |
| 3,664,063 | 5/1972 | Ware | 47/39 |
| 3,772,827 | 11/1973 | Ware | 47/39 |

*Primary Examiner*—Robert E. Bagwill
*Attorney, Agent, or Firm*—Larson, Taylor and Hinds

[57] ABSTRACT

A method and apparatus for growing plants using artificial light wherein pulsed fluorescent lamps are placed among the plants themselves below the plant tops and are pulsed on and off at a rate such that the plant can utilize the light photons in a chemically useful way with regard to that rate which maintains the lamp bulb temperature below a level that would be harmful to the plants. This technique significantly enhances growth and enables the lamps to be used as a supplemental lighting system in combination with natural light. To increase the life and overall yield of the plants an arrangement is also provided which includes a compartment containing a nutrient solution and a movable belt or the like to which the roots of a plant attach. As the plant grows and extends in length, the stem of the plant is pulled down into the nutrient solution to provide root growth area which permits the previously adventitious roots to develop as new roots on the newly submerged stem so as to maintain more optimum spacing between the plant roots and the aerial extremities of the plant, hence minimizing translocation distances that minerals and plant compounds must travel for new growth.

14 Claims, 6 Drawing Figures

PLANT GROWTH METHOD AND APPARATUS

FIELD OF THE INVENTION

The invention relates to systems for growing plants and, more particularly, to an improved controlled environment agriculture system which permits economical growing of plants on a year around basis with substantial increases in plant yield.

BACKGROUND OF THE INVENTION

An intriguing technological area which has been the subject of increasing interest is controlled environment agriculture (hereinafter referred to as CEA). In a natural environment, agriculture productivity is limited by the seasonal distribution of sunlight, temperature and moisture. In a CEA system the light energy required for growing can be provided from lamp sources geared towards maximized day lengths, intensity levels and photosynthetically useful light spectrum bands. Along with optimized temperatures, moisture and nutrients, the growing periods can be extended to long day light periods the year round with substantial increases in yields. The chief factor limiting CEA application has been the economics of such systems with previously available technology. Plant researchers have proven the potential of CEA and in recent years commercial CEA growing of seedling plants has been demonstrated to be practical. Inevitably, broader application of CEA will follow and it will have significant implications for land use, energy consumption and food quality, plus better controlled use of pesticides and fertilizers and other factors that affect the world we live in.

To aid in understanding the economics of CEA a brief review of the process of photosynthesis is helpful. It is also important to remember that the net growth potential of a plant is severely limited when growing in a natural environment and since farming began, man has quested to modify the natural environment of growing plant life to improve output. Thus, to begin the review, it is first noted that between 5 and 10% of a plant is derived from minerals and fertilizers taken up through the root system from the growing medium. It might be noted here that the worth of systems like "hydroponics" is often overemphasized since, in reality, such systems contribute to only a small fraction of a plant's growth, their actual importance lying in seeing to it that a plant is not limited as far as minerals and water is concerned. The remaining 90 to 95% of a plant is chemically synthesized by the process known as photosynthesis which, using light as the primary energy source, removes carbon dioxide ($CO_2$) and water ($H_2O$) from the environment and returns carbohydrate compounds and oxygen to the environment.

Primary production of the carbohydrate compound glucose, from which most plants are built, takes place within the leaves of a plant in cells containing chlorophyll. The chlorophyll molecules trap light photons and use these packets of energy to drive a sequential series of chemical reactions. It should be remembered that the process is sequential. Specifically, glucose, a simple sugar, is initially produced and is then reprocessed to several different compounds, ending up as some final form of carbohydrate material. The chlorophyll is not consumed in the chemical reactions but its presence, plus that of a number of mineral salts and a suitable temperature environment, is essential to both the primary production of the glucose and subsequent processing. The reaction chain is much too complex for elaboration here and suffice it to say that the final carbohydrate compounds formed are composed of some multiple of the empirical formula $CH_2O$. The simplified equation for photosynthesis is $H_2O + CO_2 \xrightarrow{Light} CH_2O + O_2$.

The carbon products manufactured by the photosynthetic process are nominally stable in air at room temperature and can be considered to be stored energy. Further, when heated, these products burn and the reaction is reversed. In the reverse process, the carbohydrate and oxygen react thereby returning carbon dioxide, water and thermal energy back to the environment. Studies of this reverse reaction show that 112 KCAL of thermal energy would be evolved for each mole equivalent of $CH_2O$. If 112 KCAL are evolved in this reverse reaction the first law of thermodynamics dictates that at least that amount of light energy was utilized in a chemically useful way in order to manufacture the carbohydrate initially.

The chemical equation for the primary production of the photosynthate glucose when balanced with the 112 KCAL of energy known to be fixed in the process is as follows:

| From the Growing Medium | From the Atmosphere | From a light source (in the forward direction) | Chemical Store | To The Atmosphere |
|---|---|---|---|---|
| $H_2O$ | + $CO_2$ | 112 KCAL Light Energy ⇌ 122 KCAL Thermal Energy | $1/6(C_6H_{12}O_6)$ | + $O_2$ | which can be converted to:

| 18 g Water | + 44 g Carbon Dioxide | .13 kWh Light Energy ⇌ .13 kWh Thermal Energy | 30 g Carbohydrate | + 32 g Oxygen |
|---|---|---|---|---|

A cursory examination of the relative costs of furnishing the required amount of light energy, water, carbon dioxide, minerals and heat shows that the light cost far exceeds the combined cost of all others. Likewise, only the carbon product output has a dollar value of interest. Accordingly, the present analysis will now be confined to CEA light costs and the output of interest. It should be noted that a plant also uses between 20 to 40% of the initially produced glucose for housekeeping purposes and that the remainder goes to plant growth product.

To proceed with the examination, a plant or crop suitable for CEA will be considered. Tomatoes are a good candidate since they can profitably utilize long day periods. Further, tomatoes are in demand the year around, with most major markets being heavily dependent on imports most of the year. The fresh weight of an average successful tomato plant is about 15 kilograms, with about 50% of this figure being the weight of the fruit. The dry weight of the fruit runs about 5% and the vine, roots, leaves and the like, about 10%. Hence, calculation shows the synthesized material to be about 1125 g. If this figure represents the final form, which is representative of 60% of the glucose manufactured, then about 1875 g of glucose is required. The light requirement of 0.13 kWh for 30 grams extended to 1874 g means that about 8 kWh of equivalent light energy has to be utilized in a chemically useful way in manufacturing the plant. With the amount of energy required to be fixed in the representative tomato plant converted to an energy term commonly used when discussing electrical energy, what amount of electrical input energy is required to fix the 8 kWh of light energy stored in the plant? To establish this value the pathway taken by the input energy is required and this is a function of the type of light the plant best utilizes vis a vis a selected light source and the light-time relationships involved.

Three important factors enter into the source selection. First, the light absorption curve for chlorophyll indicates that the efficiency at which chlorophyll electrons absorb light is dependent to a marked degree on the wavelength of the light photons. In particular, it has been found that a large majority of the light photons in the vicinity of 670 nanometers will be absorbed, perhaps half as many of the 450 nanometer photons will be absorbed, and a lower percentage in the green-yellow 500 to 600 nanometer spectral region will be absorbed. It is interesting to note that this is why plants look green in nature, i.e., many of the green photons are not absorbed but are reflected. It is obvious that the selection of a green emitting light source would not be very efficient if a large percentage of its photons would be reflected rather than used. On this basis, a lamp rich in 670 radiation would be most efficient and a blue light would be the next insofar as absorption considerations are concerned.

The second important factor is the energy utilization of each photon absorbed. Except in isolated instances it is known that an electron absorbing a photon on visible light energy is raised to either the first, second or third singlet state depending upon the wavelength of the photon. Since the wavelength is inversely proportional to the energy content, the shorter wavelength photon has more energy, i.e., a 450 nm blue photon has roughly 1½ times the energy of a 680 nm red photon. An absorbed 450 nm photon would raise the electron to the third singlet state of excitation whereas a 680 nm photon would raise the electron to the first singlet state. This is very important because it is also known that only the energy from a first singlet state can proceed to be utilized in a chemically useful way. Any electron excited above one of lower substates of the first singlet state must reduce itself by vibrational or rotational processes to a lower first singlet substate. This energy reduction, which contributes only to the kinetic motion of the molecules and not to photosynthesis, is called internal energy conversion. Once an excited electron reaches the lower substate levels of the first excited singlet state it can then either be utilized in a chemically useful way or continue the internal conversion process or be fluoresced or go to a triplet state. The foregoing clearly indicates that for primary photosynthate production the use of a red light energy source would be the most efficient. It should be noted, however, that some shorter and longer wavelength energy may be required for morphological and other processes.

The third important factor is once the photon energy is reduced to the first singlet useable state only some will be utilized in a chemically useful way while some will be refluoresced or converted to heat. Since this involves time-light relationships, this factor will be covered after first considering the types of lamps that might be used. Comparing the three basic types of light sources (1) the high intensity discharge (HID) and (2) the fluorescent, and (3) the incandescent, with their efficiencies expressed in terms of the percent of electrical input energy that is transduced into visible spectrum light, these efficiencies are about 33%, 22% and 5%, respectively. It should be noted that these efficiencies are expressed in terms of visible spectrum and not in terms of utilization for photosynthetic purposes. In fact, fluorescent lamps are the only light source that can be tailored to provide near optimum absorption spectra and coupled with its controlability, cost and other factors, such lamps are the best lamp candidate in terms of utilization of the photon energy in a chemically useful way. To carry the discussion further, and assuming overhead lamp array with reflectors, about 50% of the photons generated will fly on intercept pathways with the chlorophyll molecules in the leaves. Further, it is estimated that of the light absorbed by the leaves, approximately twenty percent, takes the first singlet state pathway to chemical utilization in conventional systems. The remaining 80% is lost through fluorescence or continuing internal energy conversion. The HID lamp depends on direct arc radiation from a gaseous arc discharge hence the spectral energy cannot be independently controlled. Such lamps also operate at very high temperatures requiring the lamps to be located some distance from the plant. the first factor results in higher internal energy conversion in contrast to a red spectrum phosphor fluorescent energy and the second factor decreases the photon-chlorophyll intercept possibilities. The combined effect of these two factors offset the higher luminosity efficiency of the HID lamp. In fluorescent lamps relative narrow band light emitting phosphors can be used to provide a light output which is spectrally matched to the most efficient chlorophyll absorption band(s). Accordingly, the absorption potential of the light received from the fluorescent lamp is greater than that of the HID lamp. Moreover, by being of more optimum wavelength, a higher percentage of the light energy absorbed is utilized in a chemically useful way. When these factors together with the relative equipment costs are considered, the fluorescent lamp is generally favored over the HID type of lamp. Further, other reasons, yet to be discussed, clearly make the fluorescent lamp the superior choice.

To account for at least one factor that reduces the quantum efficiency a limited overview as to how the light absorption process physically works is also important. A representative photosynthetic unit of a leaf includes a population of about 300 light absorbing chlorophyll "B" molecules and a single special chlorophyll "A" molecule. Each plant might have millions of these discrete photosynthetic units with each working away as a tiny photosynthate factory manufacturing glucose independently of the others. Some of the light photons which fall on the units are absorbed by the chlorophyll "B" molecules, also referred to as antenna molecules. By a complex energy transfer mechanism, the trapped light energy is then transferred to the single special chlorophyll "A", or energy processing molecule. Up to this point the process is rapid, perhaps only a few nanoseconds, but once the "A" molecule is fueled the biochemistry begins with its related processing time taking upwards to a few milliseconds. During this processing time period no more energy can be taken in by the single chemical processing molecule. If the energy held by an electron in one or more of the chlorophyll molecules cannot be transferred for processing within the finite time the absorbing electron can stay excited, the energy must then be disposed of elsewhere. Therefore, this energy, if not utilized in a chemically useful way, is lost so far as the photosynthetic process is concerned. If all photons absorbed could be utilized in a chemically useful way, about three first singlet state energy equivalent photons would be required for each molecule of final form carbohydrate produced. Converted to energy equivalents, and multiplied by the number of molecules (Avogadro's constant) per mole, the product would be the 112 KCAL previously discussed (or 672 KCAL mole for glucose). We are dealing here with a theoretical 100% quantum efficiency in which the energy from each quanta of light would hypothectically be utilized in a chemically useful way. In nature, the quantum efficiency is a few percent at best. Most researchers contend that 8 photons under laboratory conditions are required for each carbohydrate molecule synthesized. On this basis, and depending upon the wavelengths involved, between 18 and 30% of the absorbed photon energy would be chemically utilized which reasonably corresponds to the 20% referred to earlier.

Turning again to a comparative consideration of light sources, a further very important advantage of fluorescent lamps over HID lamps is that the former can be rapidly pulsed on and off while the latter cannot. A plant growth system which utilizes pulsed fluorescent lamps is disclosed in my co-pending U.S. Pat. application Ser. No. 346,902, filed on Apr. 2, 1974, which issued as U.S. Pat. No. 3,876,907 on Apr. 8, 1975, and which is a divisional application based on my earlier filed U.S. Pat. application Ser. No. 96,789, now abandoned. In this system relatively short pulses of light are used, each followed by a longer dark period which is on the order of milliseconds long. During the latter no more light energy can be utilized until the processing of the energy transferred to the energy processing chlorophyll "A" molecule is completed. Thus, photons from pulsed fluorescent lamps can be delivered to a plant in a time related manner with a higher likelihood that the special chlorophyll "A" processing molecules is at the ground state and able to receive the photon energy, thereby providing a higher utilization efficiency in terms of photons received versus photons chemically utilized. Also, the size and related cost of the iron core and copper components of the lamp system are reduced because of the limited duty cycle. Although the use of a properly mechanized pulsing fluorescent lamp obviously provides a corresponding reduction in the amount of electrical energy required, the economics of using artificial light are still such that practical systems cannot complete with conventional plant growth systems using natural light for most applications.

SUMMARY OF THE INVENTION

In accordance with one important aspect of the present invention, a method and apparatus for growing plants is provided wherein at least one fluorescent lamp is located in close proximity to, or in contact with, the plants being grown, at a level lower than the tops of the plants, the lamp preferably being pulsed "on" for a period that is no greater than the off time of the lamp. It will be appreciated that the growing system in accordance with the invention contrasts with those in the prior art wherein, whatever the type of lamp used, the lamps are mounted above the plants. This aspect of the invention is based on the inventive appreciation that by pulsing the lamps on and off in the manner described, the higher temperatures associated with conventional lighting systems are reduced to the extent that the pulse-controlled lamps can be virtually buried below the plant canopy top and can even contact the plant.

One important advantage of this technique, i.e., the provision of light within the canopy, is that the plants can be spaced closer together. For example, a conventional greenhouse tomato forest has a plant density of about 10,000 plants per acre. Using the technique described above wherein the lamps are buried among the plants themselves, this figure can be increased to perhaps 15,000 or more plants per acre. Moreover, with this close proximity geometry the photon intercept is also increased to at least 75% in contrast with the 50% figure referred to above. Further, this figure can be raised to close to 100% if a ground covering it also used, i.e., strawberries used with tomatoes.

Perhaps the most important advantage associated with this aspect of the invention is that the lamp can be used as a supplement to natural light since the lamps are not located between the plants and the sun. As part of a supplemental system, the lamps would then be required to furnish only a fraction of the 8 kWh of light energy referred to above. Further, pulsing of the lamps with an increase in quantum efficiency from 20% to perhaps 50% together with the novel arrangement of the lamps with respect to the plants produces an increased photon intercept up to perhaps 90% which would result in a considerable increase of energy utilized in a chemically useful way. Comparing the power cost to grow a 8 kWh tomato plant for (1) a continuously "on" HID system, (2) a pulsed fluorescent system and (3) a pulsed fluorescent system used only to supplement natural day light (based on the pulser providing 25% of the total energy required), and with an assumed power cost of 1.5% per input kWh and using a conservative sixteen pound yield per plant, the power cost for (1) is about 31 cents per pound but with much higher capital equipment costs, for (2) about 16 cents per pound with a lower cost base and (3) about 4 cents per pound with an even lower cost base. These figures demonstrate that it would be economically feasible to use a pulsed fluorescent system wherein the lamps are situated among the plants as supplemental plant growing system in an overall system using natural light.

A further important aspect of the invention concerns the fact that some plants, like the tomato plant being considered as a representative plant, will continue to grow and yield during the winter in a greenhouse or the like if the days did not shorten and if the greenhouse operator did not remove the plants and start over at least twice every year (although the plants would probably be removed in any event because of housing and support problems due to vine growth as well as problems concerned with supplying minerals over the ever increasing distance between the vine tip and the root tip). However, sufficient year around light is made practical by the supplemental lighting system of the invention described above, and this, coupled with the unique culturing system provided in accordance with a further aspect of the invention, enables the useful life of a plant to be extended while permitting that plant to continue to produce high yields for a much longer period of time.

According to this further aspect of the invention, a partially enclosed container or compartment is provided to contain the root system and growing medium preferably in the form of a nutrient solution, and through which is passed a movable root support element, preferably in the form of a belt or web, to which the roots of the plants to be grown become attached. As the vine grows outwardly the root support element is displaced in the opposite direction so as to pull the main stem of the plant into the root growing compartment which is periodically flooded with and drained of a nutrient solution. This arrangement will permit a new root system to develop on the stem being pulled into the root growing area in such a manner that the new root being developed on the aerial side of the root mass will tend to maintain more optimum spacing with respect to the growing vine tip and the roots. The lower vines would be cut off prior to winding the step in for rooting and the oldest root would be removed as it passes through and out of the root compartment area.

It will be appreciated that the combination of (1) cost effective light during the entire year as provided in accordance with the first aspect of the invention and (2) optimum replenishing of the root system as provided in accoreance with the second aspect of the invention, enables one to keep the plants to be grown at the most advantageous stage of growth and yield for longer periods, thereby eliminating the relatively inefficient growth and harvesting cycles now prevalent.

Other features and advantages of the invention are set forth in, or apparent from, the detailed description of the preferred embodiments found hereinbelow.

BRIEF DESCRIPTION OF THE DRAWINGS

FIG. 2 is a diagram illustrating the steps whereby the electrical input energy to a fluorescent lamp used in irradiating a plant is converted to the final form carbohydrate in the;

DESCRIPTION OF THE PREFERRED EMBODIMENTS

Figure 1:
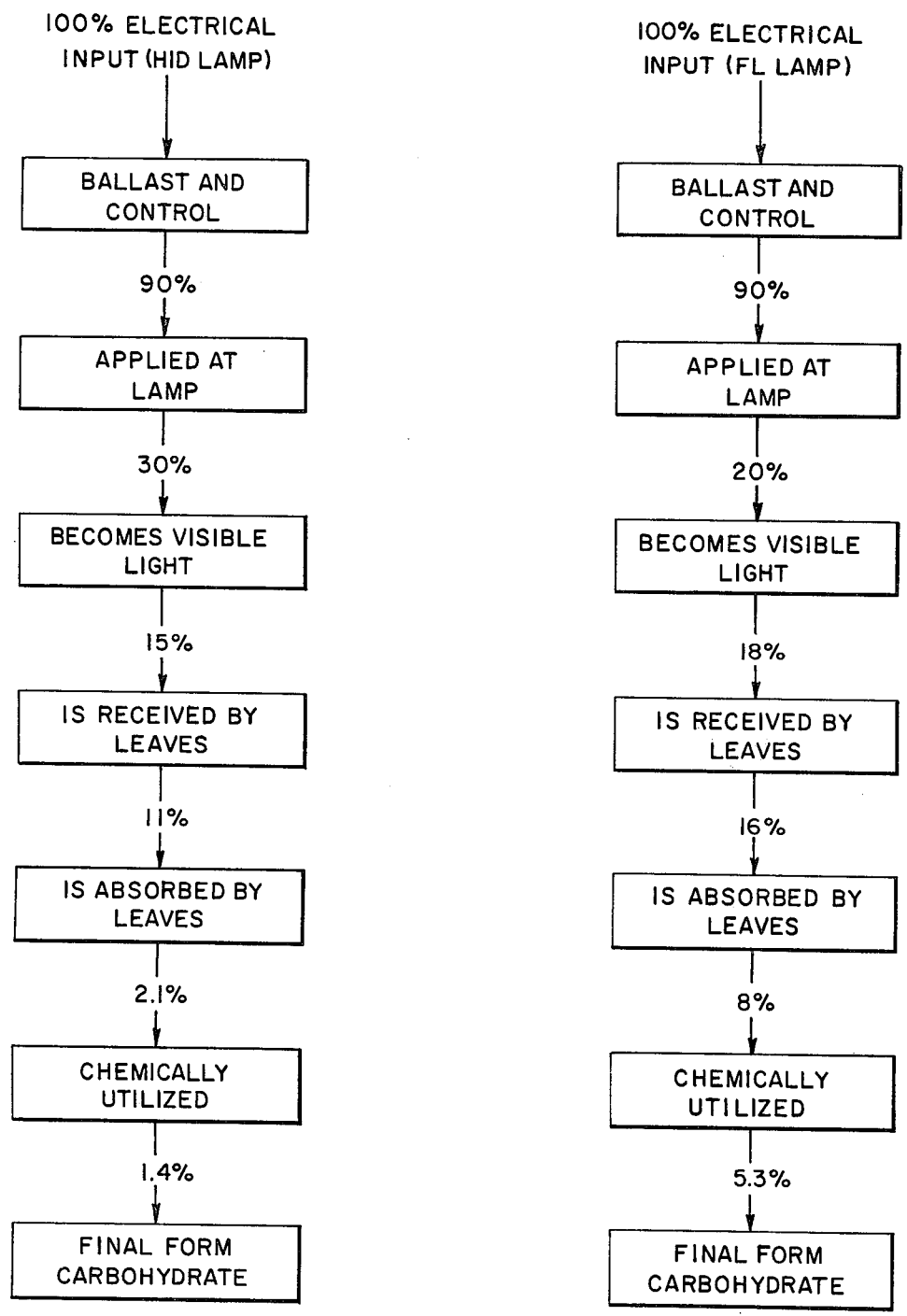
FIG. 1 is a diagram in which the plant growing efficiencies of HID and fluorescent lamps are compared.

Considering in more detail some of the points discussed above, a comparison of continuous HID and fluorescent lamp systems is provided in block diagram representative of FIG. 1. This diagram illustrates that in terms of visual luminosity the HID lamp is almost 50% more efficient than the fluorescent lamp. However, as noted, the HID lamp output is direct arc radiation whereas the fluorescent lamp output is substantially fluoroscent light whose spectral characteristics can be modified by the selection of the phosphor coating employed. As noted, direct arc radiation is essentially fixed spectrally at wavelengths which are not photosynthetically optimum whereas fluoroesent lamps can be used to provide a light output which is spectrally matched to the most efficient chlorophyll absorption bands. Thus, as shown in FIG. 1, the absorption potential of the light received from a fluorescent lamp is greater than that of an HID lamp. FIG. 1 also illustrates that a higher percentage of the light absorbed is utilized in a chemically useful way. These two factors together with the other advantages of fluorescent lamps discussed above make the fluorescent lamp the superior choice for the purposes being considered here. Moreover, as reflected in the figures given, the use of pulsing techiques together with further techniques in accordance with the present invention, raise the amount of electrical energy utilized in a chemically useful way to several times that of the HID lamp.

Figure 2:
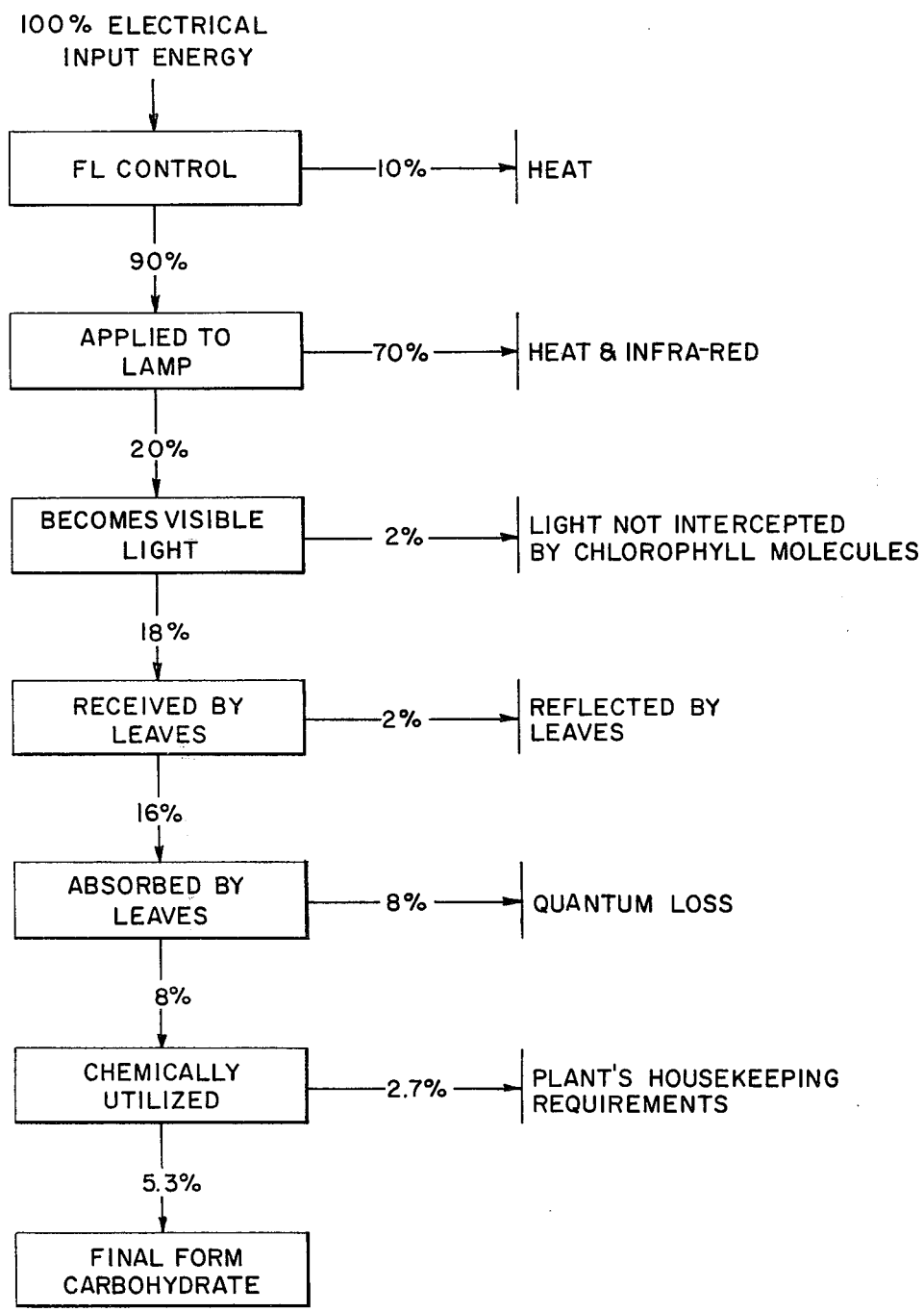

To further supplement the discussion above, FIG. 2 illustrates in more detail the electrical to plant pathway, i.e., the steps whereby the electrical input energy to a lamp irradiating a plant is converted into the final form carbohydrate of the plant.

Figure 3:
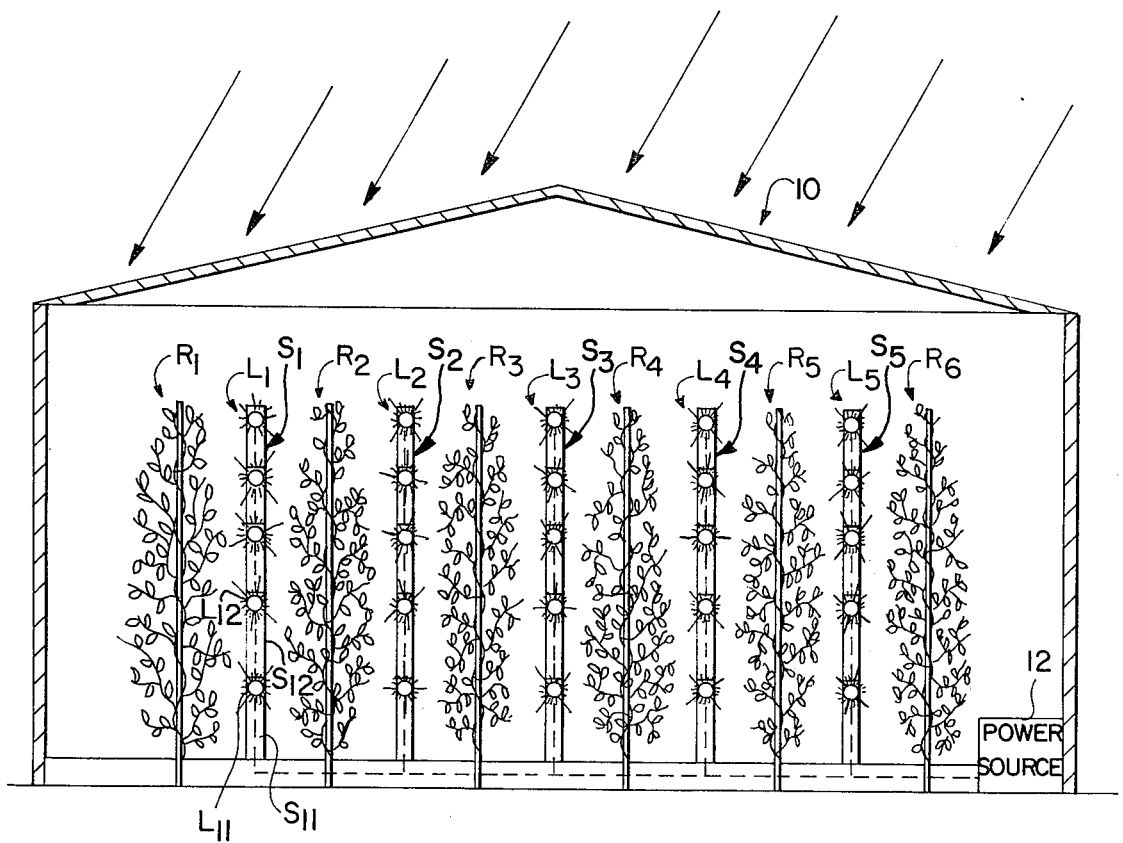
FIG. 3 is a schematic representation of a plant growth system incorporating the supplement lighting system of the invention.

Turning now to a consideration of a first aspect of the invention, as noted above, an important feature of the present invention is based on the inventive appreciation that a substantial advantage of using pulsed, fluorescent lamps is that the bulb temperature of the lamps can be significantly lowered so that the lamps no longer need to be located spatially between the plants and the sun. In particular, the lamps can be placed among the plants themselves and employed as supplemental lighting system, in addition to natural light, without shading the plants from the natural light. Thus, referring to FIG. 3, a greenhouse or other growing building, generally denoted 10, includes a series of rows of plants, $R_1$ to $R_6$, between which are located a series of banks of fluorescent lamps, $L_1$ to $L_5$. The banks of lamps $L_1$ to $L_5$ each comprises a vertical row of five lamps in the embodiment shown. In actual practice, the technique described might be most advantageously employed after high population density grown seedlings are transplanted to growing-harvesting greenhouse ranges. It will be appreciated that during the seedling growth phase not as much light is utilized since the intercept mass of the plants is not fully developed. Hence high density planting with overhead pulsing lamps would be used. The fluoroescent lamps of the supplemental growing and harvesting lighting system are preferably erected similarly to rails in a rail fence, with additional rails being added as the plants reach an optimum height. The end supports $S_1$ to $S_5$ for such a rail construction are illustrated in FIG. 3, with the rails for the individual lamps being separable as indicated by sections $S_{11}$ and $S_{12}$ for lamps $L_{11}$ and $L_{12}$. It is noted that a supplemental system such as described would probably need to furnish only the photosynthetic efficient red photons because the blue and far red photon content required for morphological or other processes would be derived from the natural radiation.

Figure 4:
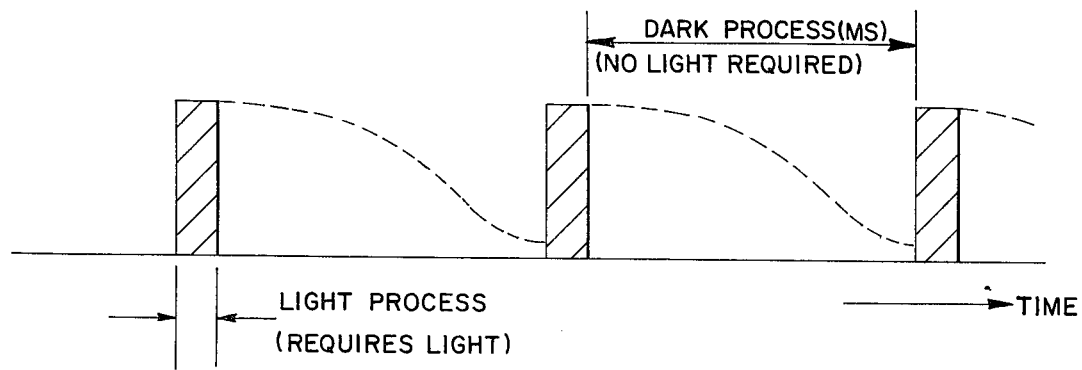
FIG. 4 is a representative light waveform associated with the plant growth system of FIG. 3.

One or more pulse sources 12 is connected to the lamps of each row of lamps $L_1$ to $L_5$ and provides pulses of the general form shown in FIG. 4. Some pulse sources and pulsing rates are disclosed in co-pending U.S. Patent application Ser. No. 346,902, referred to above. However, other pulse programs including continuously on at lower arc currents to achieve the lower bulb wall temperatures are conceivable. It will be appreciated that standard fluorescent lamps used by researchers experience bulb wall temperature rises of the order of 30° to 40°F above ambient, which when a normal efficient growing temperature, e.g., 80°F, is being maintained, the bulb wall cannot touch or be in such proximity to the plant that it would dehydrate the plant or upset its surrounding temperature environment. Obviously the ability to withstand high temperatures will vary from plant to plant.

Turning now to consideration of a second aspect of the invention, as stated above, plants such as tomato plants would continue to grow and yield in a greenhouse throughout the winter if sufficient light were available and the greenhouse operator did not remove the plants. There would, of course, be problems associated with housing and supporting the plants vines as growth continued, as well as problems in supplying the necessary nutrients over the ever increasing distance between the roots and vine tip. Before proceeding, it should be noted that plants do not need dirt for growing and many successful growing systems employ growing mediums ranging from gravel beds with nutrient solutions added, to neutral cultures such as vermiculite and peat with periodic fertilization. In general, the roots of a plant merely need something to attach themselves to in order to support the aerial growth of the plant. The tomato plant, the exemplary candidate crop under consideration here, starts to grow adventitious roots all along the main aerial stem. After the stem protrudes from the growing medium so that the surrounding air is contacted the root growth stops but adventitious roots stand ready to develop further if the opportunity presents itself. A good example of this characteristic is a tomato vine stem which falls so as to contact a growing medium like the ground; this stem will root at the contact point and, if permitted will develop a new and extensive root system in this area.

Figure 5A:
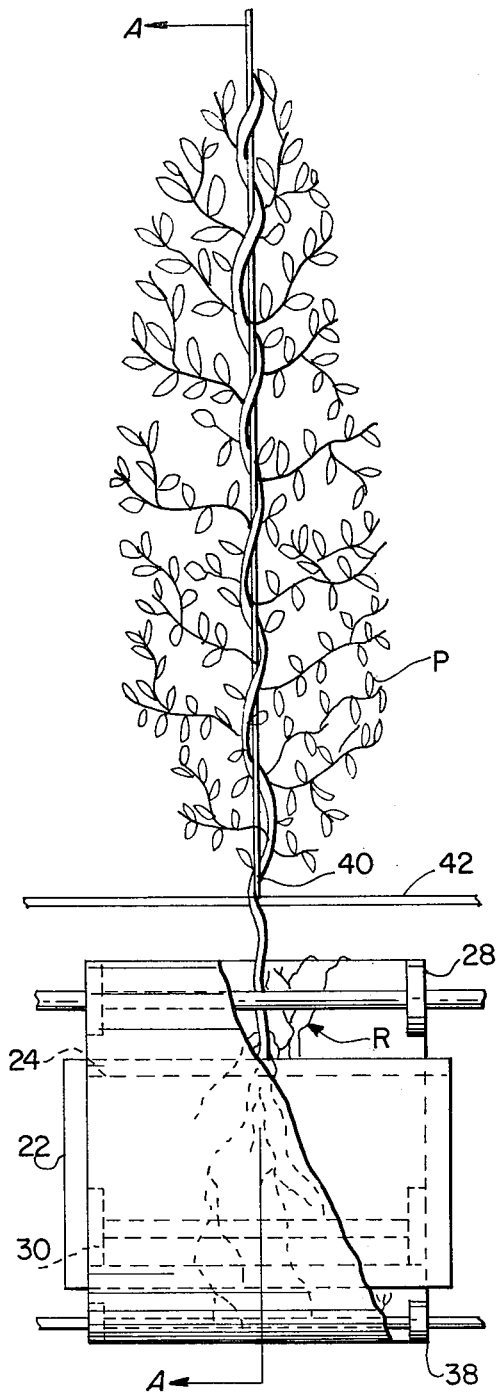
FIGS. 5($a$) and 5($b$) are front and transverse cross-sectional views of an arrangement for extending plant growth and yield in accordance with a further aspect of the invention.
Figure 5B:
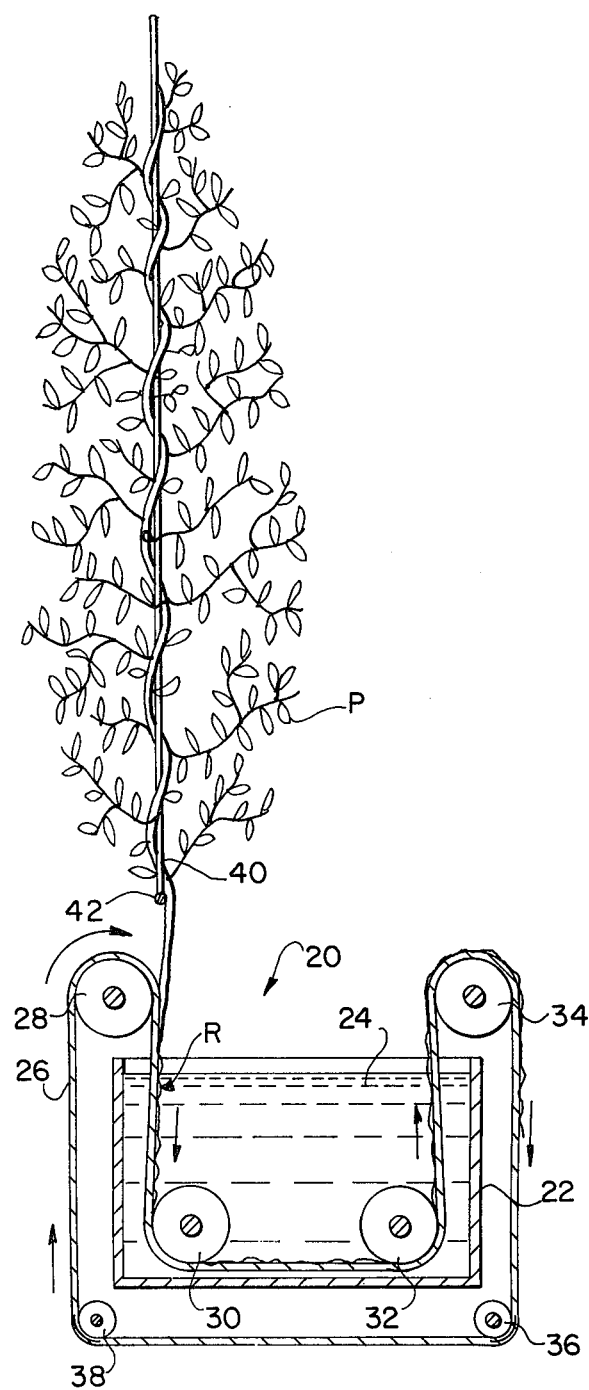

Referring to FIGS. 5a and 5b, there is shown an arrangement for enhancing the growth of a plant and extending the useful life thereof. This arrangement, which is generally denoted 20 includes a container 22 in which the plant denoted P, grows. Container 22 contains the plants root system which is periodically flooded and drained of a nutrient solution 24, the nutrient solution 24 being shown at flood level in the drawings.

An endless perforated plastic or non-corrosive metal belt 26 is driven by a drive mechanism which includes a drive roller 28 located outside of the container 22 and connected to a suitable drive source (not shown), a pair of idler rollers 30 and 32 located within container 22 and three further idler rollers 34, 36 and 38 arranged, as shown, outside of the container 22 to provide a complete drive loop. With this arrangement, a portion of the belt 24 extends into the nutrient solution 24 in container 22 and can be displaced within container 22.

Belt 26 is arranged so that the roots, denoted R, of plant P attach and grow thereon and are at least periodically within solution 24, the belt 26 being constructed as a mesh, or otherwise including numerous perforations as shown in FIG. 5(a), so as to enhance rooting of the plant. A vertical length of twine 40 is provided so that the plant can vine upwardly. The location of twine 40 is of secondary importance and in the embodiment illustrated the twine 40 is terminated above the belt drive arrangement and is connected to a horizontal length of twine 42 which joins a series of other vertically extending lines (not shown) for other plants. In this regard it is contemplated that a plurality of arrangements such as just described would be used in conjunction with a lighting system described above in connection with FIG. 3, although, of course, the arrangement can also be used independently of such a system or systems.

In accordance with the invention, as the plant P is extended by growth, the belt 26 is periodically displaced in the direction indicated by the arrow in FIG. 5(b) so as to pull the main stem of the plant downward into the growing medium, i.e., into the nutrient solution 24. In this way the system shown permits new root to develop on the stem being pulled into the growing medium in such a manner that the new root develops on the aerial side of the root mass thereby maintaining more optimum spacing between the growing vine tip and the root mass. In use, the lower vines of the plant P would be cut off prior to winding in the stem for further rooting and the oldest root would probably be removed as it emerges from the nutrient solution.

It will be appreciated that the combination of cost effective year around lighting as described earlier together with the arrangement just discussed whereby new roots are provided to continually replenish the old at the aerial end of the root system, the plant can be kept at the most advantageous stage of growth and yield for longer periods, thereby minimizing cyclic harvesting associated with tomato plants and the like. It will also be understood that the embodiment of this feature of the invention is merely exemplary and movement of the plant to enhance root growth may be accomplished in other ways.

It will be understood by those skilled in the art that although the invention has been described relative to exemplary embodiments thereof, modifications and variations can be effected in these embodiments without departing from the scope and spirit of the invention.

I claim:

1. A method for growing higher order plants, said method comprising locating at least one fluoroescent lamp in close proximity to the plants to be grown at a level lower than the tops thereof and pulsing the lamp on a limited duty-cycle so as to keep the bulb wall temperature of the lamp below a value that would damage the plant, said method further comprising providing a growing medium for at least one of the plants including a liquid nutrient solution and pulling the stem of said at least one of the plants into the growing medium at a selected time in the growth cycle thereof to enable further rooting of the plant to take place at the portion of the stem pulled into the growing medium.

2. A method as claimed in claim 1 wherein said lamp is located in contact with the plants to be grown.

3. A method of growing higher order plant life wherein the plants to be grown are arranged in a selected pattern in a location which permits sunlight to fall on the plants, said method comprising locating at least one fluorescent lamp between at least two of the plants in close proximity to the plants and in a location in which sunlight is not blocked from falling on said plants, and which normally would not receive direct sunlight, and pulsing said at least one lamp on and off, the "on" time of said lamp being no greater than the "off" time of the lamp.

4. A method as claimed in claim 3 wherein the lamp is pulsed on cyclically for a period which is substantially less than the "off" time of the lamp.

5. A method as claimed in claim 3 wherein said plants are arranged in rows and at least one said fluorescent lamp is located between each of said rows.

6. A method as claimed in claim 3 wherein said plants are arranged in rows and a bank of at least two fluorescent lamps is located between said at least two rows, the longitudinal axis of the lamps of said bank of lamps extending substantially parallel to the ground and said two lamps of said bank of lamps being spaced apart vertically in the same plane.

7. An arrangement for growing higher order plants comprising:

An enclosure having a construction that permits natural sunlight to irradiate the plants, a plurality of fluorescent lamps located among the plants in close proximity thereto and in positions which are beneath the tops of the plants so as to permit sunlight to irradiate the plants without hindrance from said lamps, and which provide that portions of the plant which normally do not receive direct sunlight are irradiated by the lamps and means for pulsing said lamps on and off in accordance with a predetermined, variable duty cycle, the "off" time of said lamps being greater than the "on" time of said lamps.

8. An arrangement as claimed in claim 7 wherein plants are arranged in rows and a bank of lamps is positioned between the rows, said bank of lamps comprising a plurality of vertically stacked, detachably mounted lamps.

9. An arrangement as claimed in claim 8 wherein at least some of said plants are grown in an artificial growing medium, comprising a nutrient solution said arrangement further comprising movable means providing a rooting site for the plants grown in said artificial growing medium, and means for selectively moving said movable means so that the plants rooted thereon are pulled into said growing medium to enable further rooting of the plant.

10. An arrangement for prolonging the growth of plant life and maintaining a plant at the most advantageous stage of growth and yield, said arrangement comprising:

means providing a growing medium comprising a nutrient solution for the plant to be grown, and mechanical means for enabling the plant to be pulled into the growing medium at a desired time to enhance further rooting by the plant at the portion of the plant pulled into the growing medium 11. An arrangement as claimed in claim 10 wherein said mechanical means comprises a movable member providing a growth area for development of the root system for the plant and drive means for displacing said movable member relative to said growing medium.

12. An arrangement as claimed in claim 11 wherein said movable member comprises a continuous perforate belt, at least a portion of which extends into said growing medium and said drive means comprising a drive roller and a plurality of further rollers upon which said belt is mounted.

13. An arrangement as claimed in claim 12 wherein said means providing a growing medium comprises a container containing said nutrient solution.

14. An arrangement as claimed in claim 10 further comprising at least one fluorescent lamp located in close proximity to the plant being grown and at a level lower than the top thereof and means for pulsing said lamp off and on to irradiate said plant, the "on" time of said lamp being substantially less than the "off" time of said lamp.

* * * * *